US012452589B2

(12) United States Patent
Han et al.

(10) Patent No.: US 12,452,589 B2
(45) Date of Patent: Oct. 21, 2025

(54) MICROPHONE CIRCUIT, MICROPHONE MODULE, AND METHOD FOR RAISING SOUND PRESSURE OVERLOAD POINT OF MICROPHONE

(71) Applicant: AAC ACOUSTIC TECHNOLOGIES (SHENZHEN) CO., LTD., Shenzhen (CN)

(72) Inventors: Dong Han, Singapore (SG); Chuationg Kee, Singapore (SG)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 32 days.

(21) Appl. No.: 17/918,898

(22) PCT Filed: Apr. 28, 2022

(86) PCT No.: PCT/CN2022/090025
§ 371 (c)(1),
(2) Date: Oct. 13, 2022

(87) PCT Pub. No.: WO2023/184640
PCT Pub. Date: Oct. 5, 2023

(65) Prior Publication Data

US 2025/0039601 A1 Jan. 30, 2025

(30) Foreign Application Priority Data

Apr. 1, 2022 (CN) ......................... 202210349181.3

(51) Int. Cl.
*H04R 3/00* (2006.01)
*H04R 1/00* (2006.01)

(52) U.S. Cl.
CPC ................. *H04R 3/00* (2013.01); *H04R 1/00* (2013.01)

(58) Field of Classification Search
CPC ............... H04R 3/00; H04R 1/00; H04R 3/10
USPC ............................ 381/92, 111, 113–114, 122
See application file for complete search history.

(56) References Cited

U.S. PATENT DOCUMENTS 11,618,671 B2 * 4/2023 Chen ....................... B81B 7/007 257/414
11,956,586 B2 * 4/2024 Hatfield .............. H04M 1/6058

* cited by examiner

*Primary Examiner* — Disler Paul
(74) *Attorney, Agent, or Firm* — Wiersch Law Group

(57) ABSTRACT

The invention provides a microphone circuit, which includes an amplifier, a bias resistor and a bias network module. The first terminal of bias resistor connects to the preset bias voltage. The second end of the bias resistor connects the output end of the microphone. The bias network module is used to judge level of the voltage value of the signal. If the voltage value of the signal exceeds the preset voltage value of the threshold voltage group range, connect the impeder corresponding to the bias network module to the input end of the microphone circuit. The invention provides a microphone module and a method for raising sound pressure overload point of microphone. Compared with the related art, the technical scheme of the invention improves the sound pressure overload point of microphone and has good electrical performance.

7 Claims, 4 Drawing Sheets

MICROPHONE CIRCUIT, MICROPHONE MODULE, AND METHOD FOR RAISING SOUND PRESSURE OVERLOAD POINT OF MICROPHONE

FIELD OF THE PRESENT DISCLOSURE

The invention relates to the technical field of the microphone circuit, in particular to a microphone circuit, a microphone module and a method for raising sound pressure overload point of microphone applied to a microphone.

DESCRIPTION OF RELATED ART

With the increasing application of smart mobile devices. Microphones for converting sound into electric signals are becoming more and more important. The microphone circuit that drives the output of the signal from the microphone affects the effect and performance of the smart mobile device.

Please refer to the FIG. 1, which is a schematic view of the circuit module of the microphone circuit of the related art. The microphone circuit of the related art include an amplifier AMP and a resistor R. The amplifier AMP is used to receive the signal Vin output by the external microphone Mic, amplify the signal Vin and then output it, and the output signal is Vout. A first end of the resistor R is used to connect to the preset bias voltage Vbias. Wherein, voltage value of the bias voltage Vbias is 0.8v. A second end of the resistor R is used to connect to the output end of the microphone Mic, and the second end of the resistor R is connected to the input end of the amplifier and used as the input end of the microphone circuit. The value of the resistor R is 200 G ohms. The output end of the amplifier AMP is used as the output end of the microphone circuit. Wherein, the first end of the microphone Mic is connected to the high voltage bias voltage Vcp, and the voltage is 13.8v. The second end of the microphone Mic is used as the output end of the microphone Mic.

Therefore, it is necessary to provide a new microphone circuit, module and method to solve the above technical problems.

SUMMARY OF THE PRESENT INVENTION

The object of the present invention is to overcome the above-mentioned technical problems, and provides a microphone circuit, a microphone module and a method for raising sound pressure overload point of microphone that have improved the sound pressure overload point of microphone and have good electrical performance.

For achieving the above-mentioned object, the present invention provides a microphone circuit including:

an amplifier for receiving a signal output by an external microphone, and amplifying the signal;

a bias resistor having a first end connecting to a preset bias voltage and a second end connecting to an output end of the microphone and connecting to an input end of the amplifier;

wherein, the amplifier serves as an input end of the microphone circuit; the output end of the amplifier serves as the output end of the microphone circuit;

the microphone circuit further includes a bias network module connected to the input end of the microphone circuit for judging a voltage value of the signal;

when the voltage value of the signal exceeds a preset voltage value of a threshold voltage group range, connect a impeder corresponding to the bias network module to the input end of the microphone circuit to reduce the vibration amplitude of the signal; and the impeder corresponds to the threshold voltage group one-to-one.

Further, the threshold voltage group includes an upper threshold voltage and a lower threshold voltage; the voltage value of the threshold voltage group is less than or equal to that of the upper threshold voltage and greater than or equal to the voltage value of the lower threshold voltage.

Further, the bias network module includes a first bias network circuit having a first PMOS tube, a first NMOS tube, and a first impeder. A source electrode of the first PMOS tube connects to the first lower bias voltage, and a drain electrode of the first PMOS tube connects to the drain electrode of the first NMOS tube and a first end of the first impeder. A grid electrode of the first PMOS tube connects to the input end of the microphone circuit, and the grid electrode of the first PMOS tube is respectively connected to the grid electrode of the first NMOS tube and the second end of the first impeder. A source electrode of the first NMOS tube connects to the first upper bias voltage.

The upper threshold voltage of the first bias network circuit is a sum of the voltage value of the first upper bias voltage and the voltage value of the n-type transistor turn-on threshold voltage of the first NMOS tube; the lower threshold voltage of the first bias network circuit is a sum of the voltage value of the first lower bias voltage and the voltage value of the p-type transistor turn-on threshold voltage of the first PMOS tube.

In addition, the bias network module further includes an nth bias network circuit, where n is a positive integer and not less than 2; the nth bias network circuit includes a nPMOS tube, a nNMOS tube and a nth impeder. The source electrode of the nPMOS tube is used for connecting to the nth lower bias voltage, and the drain electrode of the nPMOS tube is respectively connected to the drain electrode of the nNMOS tube and the first end of the nth impeder. The grid electrode of the nPMOS tube is used for connecting to the input end of the microphone circuit, and the grid electrode of the nPMOS tube is respectively connected to the grid electrode of the nNMOS tube and the second end of the nth impeder.

The source electrode of the nNMOS tube is used to connect to the nth bias voltage. The upper threshold voltage of the nth bias network circuit is the sum of the voltage value of the nth upper bias voltage and the voltage value of the n-type transistor turn-on threshold voltage of the nNMOS tube; the lower threshold voltage of the nth bias voltage network circuit is the sum of the voltage value of the nth lower bias and the voltage value of the p-type transistor turn-on threshold voltage of the nPMOS tube. The first upper bias voltage is smaller than the nth upper bias voltage, and the nth lower bias voltage is smaller than the first lower bias voltage.

In addition, the amplifier includes a constant current source and a first transistor. An input end of the constant current source is connected to the power supply voltage. An output end of the constant current source is connected to the first source electrode of the transistor, and the first source electrode of the transistor serves as the output end of the microphone circuit. The first grid electrode of the transistor serves as the input end of the microphone circuit, and the first drain electrode of the transistor is connected to ground.

The present invention further provides a microphone module, including a microphone capacitor and a microphone circuit as described above. The first end of the microphone capacitor is connected to the bias voltage of microphone, and the second end of the microphone capacitor is connected to the input end of the microphone circuit. The microphone capacitor is equivalently formed when the microphone is connected to the input end of the microphone circuit.

The present invention further provides a method for raising a sound pressure overload point of a microphone, which is applied to a microphone circuit having an amplifier for receiving a signal output by an external microphone, and amplifying the signal; a bias resistor having a first end connecting to a preset bias voltage and a second end connecting to an output end of the microphone and connecting to an input end of the amplifier.

Further, the amplifier serves as an input end of the microphone circuit; the output end of the amplifier serves as the output end of the microphone circuit. The microphone circuit further includes a bias network module connected to the input end of the microphone circuit for judging a voltage value of the signal.

The method includes the following steps of:

Step s1, receiving the signal;

Step s2, determining whether a voltage value of the signal exceeds a preset voltage value of a threshold voltage group range: if yes, connecting the preset impeder to the input end of the microphone circuit to reduce the vibration amplitude of the signal; if not, sending the received signal to the input end of the amplifier;

the impeder corresponds to the threshold voltage group one-to-one.

In addition, the threshold voltage group includes n pieces of threshold voltage group, and n pieces of impeder; each of the threshold voltage groups corresponds to one of the impeders.

The microphone circuit provided by the present invention sets a bias network module at the position where the external output end of the microphone is connected, and judges the voltage value of the signal output by the microphone through the bias network module. If the voltage value of the signal exceeds the preset voltage value of the threshold voltage group range, connect the impeder corresponding to the bias network module to the input end of the microphone circuit to reduce the vibration amplitude of the signal. The circuit configuration makes the equivalent load resistance of the output end of the microphone smaller by additionally connecting the preset impeder when the vibration amplitude of the signal exceeds the preset voltage value range. Therefore, the vibration amplitude of the signal is reduced, so that the vibration amplitude of the output signal of the amplifier is within the power supply voltage of the amplifier and the clamping range of the grounding. Therefore, the microphone circuit, the microphone module and the method for raising the sound pressure overload point of microphone provided by the present invention improve the sound pressure overload point of microphone, so that the total harmonic distortion performance is good, so that the output electrical signal is good.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Embodiment 1

The embodiment of the present invention provides a microphone circuit 100.

Figure 1:
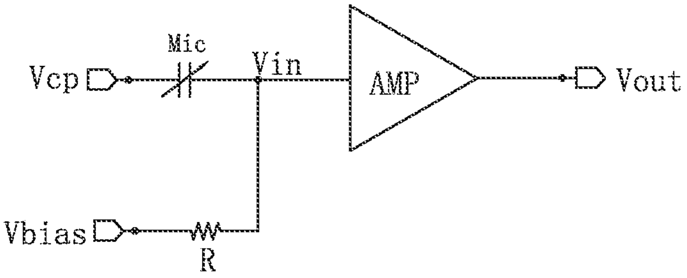
FIG. 1 is an application circuit view of a related art microphone circuit.
Figure 2:
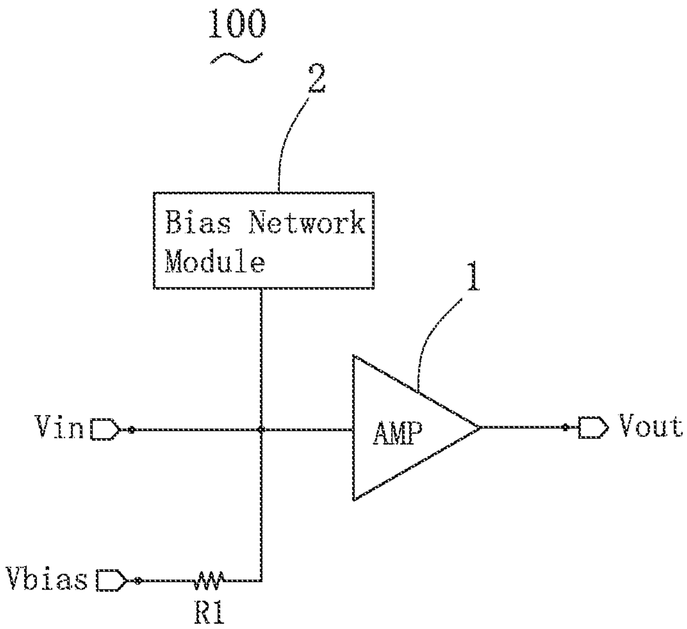
FIG. 2 is a schematic view of a circuit module of a microphone circuit of the present invention.

Please refer to FIG. 2, which is a schematic view of the circuit module of the microphone circuit of the present invention. The microphone circuit 100 includes an amplifier 1, a bias resistor R1 and a bias network module 2.

The amplifier 1 is used to receive the signal Vin output by the external microphone Mic, and amplify the signal Vin and output it.

The first end of the bias resistor R1 is used to connect to the preset bias voltage Vbias; the second end of the bias resistor R1 is used to connect the output end of the microphone Mic, and the second end of the bias resistor R1 is connected to the input end of the amplifier 1. The input end of the amplifier 1 is used as the input end of the microphone circuit 100. The input end of the amplifier 1 is used as the output end of the microphone circuit 100.

The bias network module 2 is connected to the input end of the microphone circuit 100. The bias network module 2 is used for judging the level of the voltage value of the signal Vin. When the voltage value of the signal Vin exceeds the preset voltage value range of the threshold voltage group, the impeder corresponding to the bias network module 2 is connected to the input end of the microphone circuit 100 to reduce the signal Vin's vibration amplitude. Wherein, the impeder corresponds to the threshold voltage group one-to-one.

Specifically, the threshold voltage group includes an upper threshold voltage and a lower threshold voltage. The voltage value range of the threshold voltage group is less than or equal to the upper threshold voltage, and greater than or equal to the voltage value of the lower threshold voltage.

The circuit structure of the microphone circuit 100 is such that when the vibration amplitude of the signal Vin exceeds the preset voltage value range, a preset impeder is additionally connected, thereby reducing the equivalent load resistance of the output end of the microphone Mic. Thus, the vibration amplitude of the signal Vin is reduced, so that the vibration amplitude of the output signal Vout of the amplifier 1 is within the clamping range of the power supply voltage VDD and the grounded GND of the amplifier 1. The microphone circuit 100 provided by the present invention improves the sound pressure overload point AOP of the microphone, so that the total harmonic distortion thd performance is good, and the output electrical signal is good.

The impeder is capacitive impeder or resistive impeder. In this embodiment, the impeder is variable capacitive impeder, and capacitive impeder can better reduce the equivalent load resistance of the output end of the microphone Mic, thereby reducing the vibration amplitude of the signal Vin.

Embodiment 2

The second embodiment of the present invention provides a microphone circuit 200. Wherein, the microphone circuit 200 is a specific circuit of the microphone circuit 100 in the embodiment 1.

Figure 3:
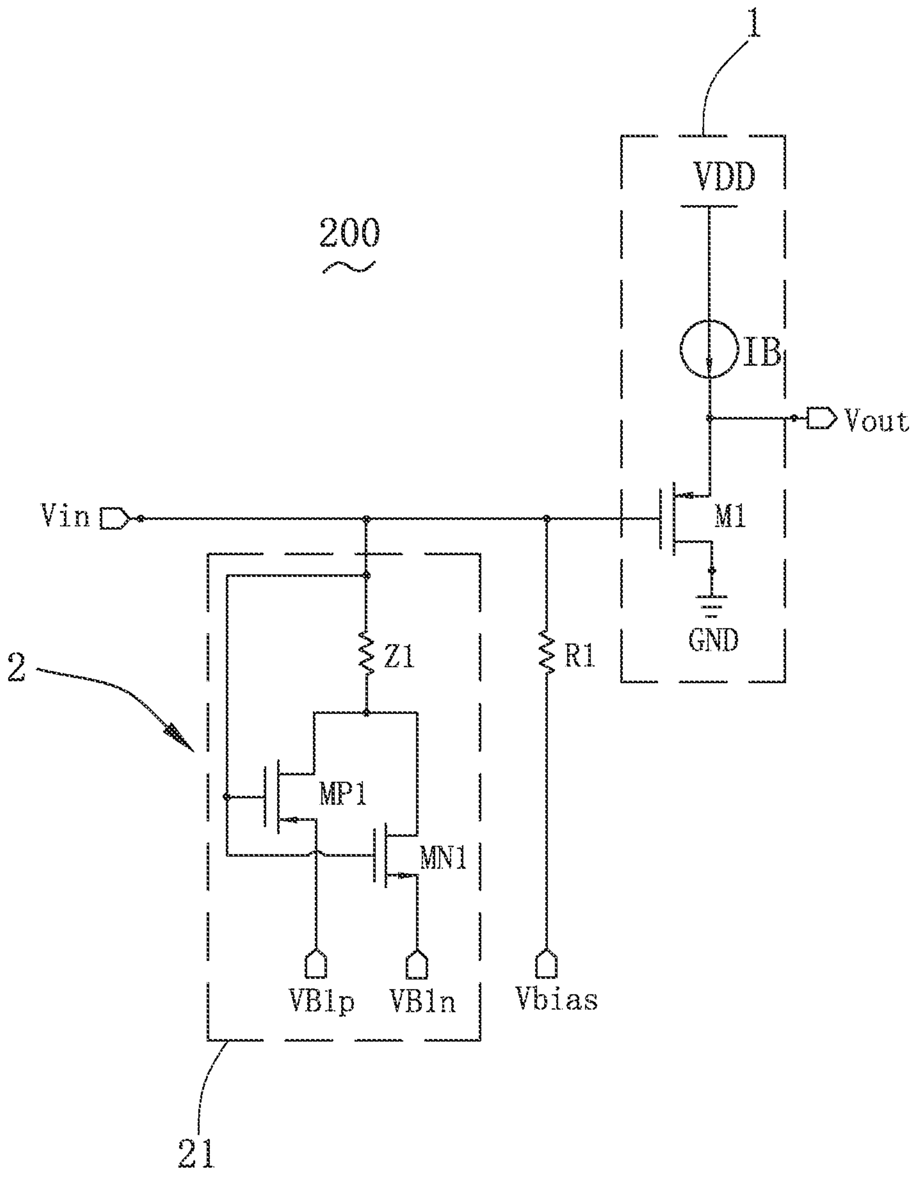
FIG. 3 illustrates a microphone circuit of an embodiment of the present invention.

Please refer to FIG. 3, which is a circuit view of the second embodiment of the microphone circuit 200 of the present invention.

The amplifier 1 includes a constant current source IB and a first transistor M1. The first transistor M1 is a PMOS tube. In this embodiment 2, the amplifier 1 is a source follower.

The input end of the constant current source IB is connected to the power supply voltage VDD.

The output end of the constant current source IB is connected to the source electrode of the first transistor M1.

The constant current source IB of the source electrode of the first transistor M1 is used as the output end of the microphone circuit 100.

The grid electrode of the first transistor M1 is used as the input end of the microphone circuit 100.

The drain electrode of the first transistor M1 is connected to the grounded GND.

The bias network module 2 includes a first bias network circuit 21.

Specifically, the first bias network circuit 21 includes a first PMOS tube MP1, a first NMOS tube MN1 and a first impeder Z1.

The source electrode of the first PMOS tube MP1 is connected to the first lower bias voltage VBVB1*p*, and the drain electrode of the first PMOS tube MP1 is respectively connected to the drain electrode of the first NMOS tube MN1 and the first end of the first impeder Z1.

The grid electrode of the first PMOS tube MP1 is used to connect to the input end of the microphone circuit 100. And the grid electrode of the first PMOS tube MP1 is respectively connected to the grid electrode of the first NMOS tube MN1 and the second end of the first impeder Z1.

The source electrode of the first NMOS tube MN1 is used to connect to the first upper bias voltage VB1*n*.

The lower threshold voltage of the first bias network circuit 21 is the sum of the voltage value of the first lower bias voltage VB1*p* and the voltage value Vthp of the P-type transistor turn-on threshold voltage of the first PMOS tube MP1. The upper threshold voltage of the first bias network circuit 21 is the sum of the voltage value of the first upper bias voltage VB1*n* and the voltage value of the N-type transistor turn-on threshold voltage Vthn of the first NMOS tube MN1.

The working principle of the microphone circuit 200 is described below:

When the external sound pressure received by the external microphone Mic is small, that is, when the amplitude of the signal Vin output by the microphone Mic is small, the signal Vin satisfies: Vin<VB1*n*+Vthn, Vin>VB1p−Vthp. The first PMOS tube MP1 and the first NMOS tube MN1 MN1 are disconnected, and the load of the microphone Mic is mainly the bias resistor R1. In this embodiment, the resistance value of the bias resistor R1 is usually set to 200 GΩ. Because resistance value of the bias resistor R1 resistance is large, it will not cause a significant reduction in the signal to noise ratio.

When the external sound pressure received by the external microphone Mic is relatively large, that is, when the amplitude of the signal Vin output by the microphone Mic is relatively large, the signal Vin satisfies:

When Vin>VB1*n*+Vthn, the first NMOS tube MN1 is turned on, or when Vin<VB1*p*−Vthp, the first PMOS tube MP1 is turned on. The first impeder Z1 of the first bias network circuit 21 starts to be loaded onto the output end of the microphone Mic. From the circuit connection relationship between the first impeder Z1 and the bias resistor R1, a voltage divider effect occurs, and the vibration amplitude of the signal Vin is compressed by the first impeder Z1. Therefore, for the same sound pressure, the vibration amplitude of the signal Vin is smaller than the signal Vin of the microphone circuit in the related art, so that the output signal Vout can be output normally. It does not occur that the output signal Vout is clamped by the power supply voltage VDD of the amplifier 1 and the ground GND to flatten the waveform. Therefore, a larger external sound pressure is required for the output signal Vout to be clamped by the power supply voltage VDD and grounded GND of the amplifier 1, so the sound pressure overload point AOP of the overall circuit is improved. Thus, the total harmonic distortion thd performance is good, and the output electrical signal is good.

Embodiment 3

The third embodiment of the present invention provides a microphone circuit 300.

Figure 4:
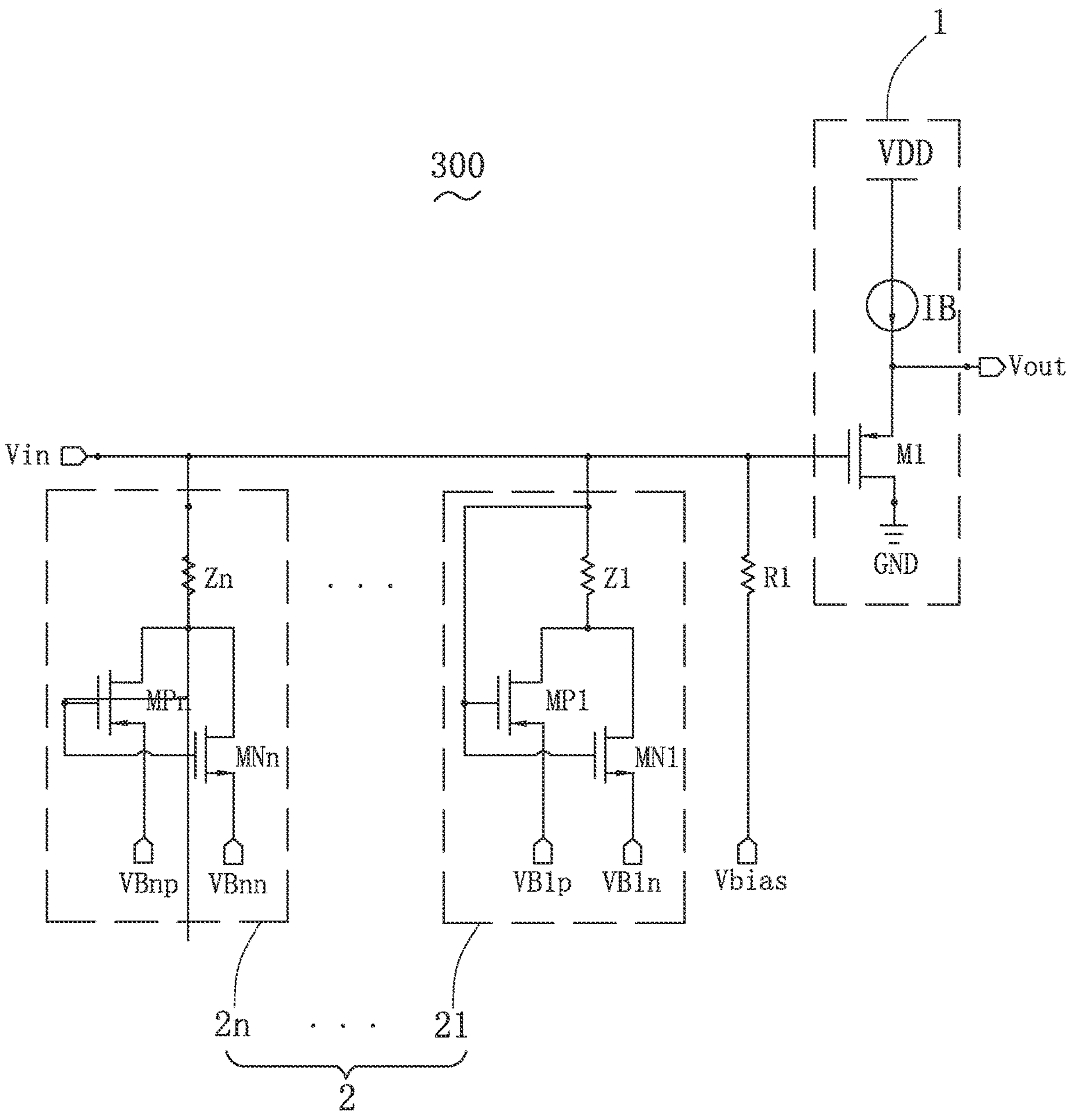
FIG. 4 illustrates a microphone circuit of another embodiment of the present invention.

Please refer to FIG. 4, which is a circuit view of the third embodiment of the microphone circuit 300 of the present invention. Wherein, the difference between the microphone circuit 300 and the microphone circuit 200 in the embodiment 2 is: The bias network module 2 further includes a nth bias network circuit 2*n*. n is a positive integer and satisfies: n≥2; the nth bias network circuit includes a nPMOS tube MPn, a nNMOS tube MNn and a nth impeder Zn.

The source electrode of the nPMOS tube MPn is connected to the nth lower bias voltage VBnp, and the drain electrode of the nPMOS tube MPn is respectively connected to the drain electrode of the NMOS tube MNntube MNn and the first end of the nth impeder Zn.

The grid electrode of the nPMOS tube MPn is used to connect to the input end of the microphone circuit, and the grid electrode of the nPMOS tube MPn is respectively connected to the grid electrode of the NMOS tube MNntube MNn and the second end of the nth impeder Zn.

The source electrode of the nNMOS tube MNntube MNn is used to connect to the nth bias voltage VBnn.

Wherein, the lower threshold voltage of the nth bias network circuit is the sum of the voltage value of the nth lower bias voltage VBnp and the voltage value of the P-type turn-on threshold voltage of the transistor of the nPMOS tube mpn. The upper threshold voltage of the nth bias network circuit is the sum of the voltage value of the nth upper bias voltage VBnn and the voltage value of the N-type transistor turn-on threshold voltage of the nNMOS tube MNn.

The microphone circuit 300 of the present invention is equivalent to adding n bias network circuits on the basis of the microphone circuit 200 of the second embodiment, that is, adding n pcs of the first bias network circuits 21. That is to say, the bias network module 2 includes a first bias network circuit 21, . . . a nth bias network circuit 2$n$. That is, dividing the bias network module 2 into n segments, and in sequence adding a first impeder Z1, a second impeder, . . . and the load from the nth impeder Zn to the microphone Mic. Segment compression is implemented on the signal Vin output by the microphone Mic. Wherein, The first upper bias voltage VB1$n$ is smaller than the nth upper bias voltage VBnn. That is, the nth upper bias voltage VBnn is greater than the first upper bias voltage VB1$n$. VB1$n$< . . . <VBnn, that is, the voltage value of the first upper bias voltage VB1$n$ is set higher and higher in the direction of the voltage value of the nth upper bias voltage VBnn.

The nth lower bias voltage VBnp is smaller than the first lower bias voltage VB1$p$. That is, the first lower bias voltage VB1$p$ is greater than the nth lower bias voltage VBnp. VB1$p$> . . . >VBnp, that is, the voltage value of the first lower bias voltage VB1$p$ is set lower and lower toward the direction of the voltage value of the nth lower bias voltage VBnp. This setting makes the bias network module 2 divided into n segments, so that the larger the amplitude of the signal Vin output by the microphone Mic is, the more impeders to which the bias network module 2 is connected, the vibration amplitude of the signal Vin is compressed by the continuous parallel impeder, and the smaller the equivalent load impeder on the microphone Mic is, the smaller the vibration amplitude of the signal Vin is. Therefore, the output signal Vout can be output normally.

Embodiment 4

The embodiment 4 of the present invention provides a microphone module 400.

Figure 5:
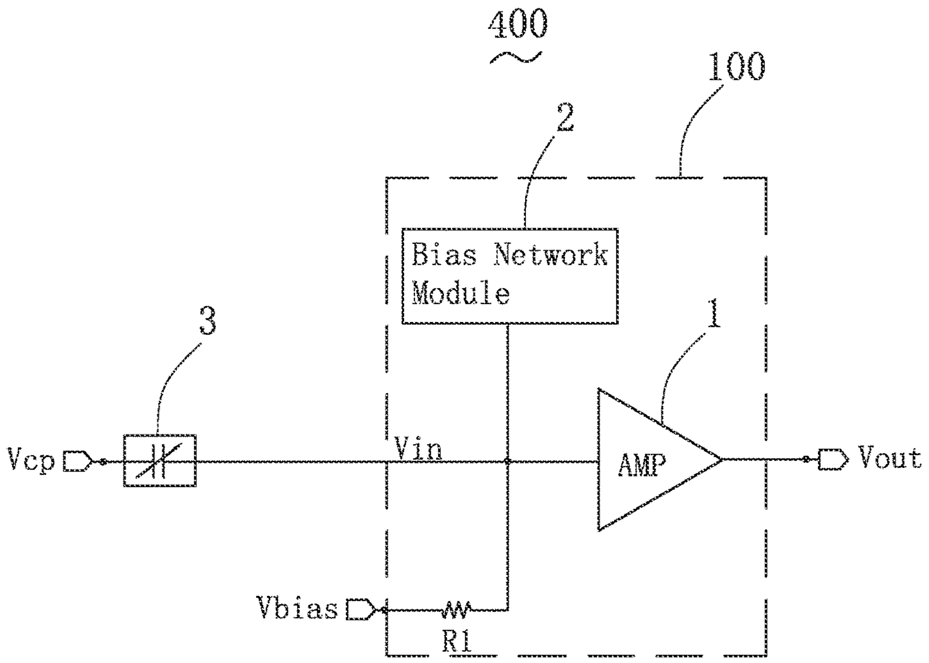
FIG. 5 illustrates a circuit module of the microphone module of the present invention.

Please refer to FIG. 5, which is a schematic view of the circuit module of the microphone module 400 of the present invention.

The microphone module 400 includes a microphone capacitor 3 and the microphone circuit 100. The first end of the microphone capacitor 3 is connected to the bias voltage VCP of the microphone. The second end of the microphone capacitor 3 is connected to the input end of the microphone circuit 100. Wherein, the microphone capacitor 3 is equivalently formed when the microphone device is connected to the input end of the microphone circuit 100.

Embodiment 5

The embodiment 5 of the present invention provides a method for raising sound pressure overload point of microphone.

The method for raising sound pressure overload point of microphone is applied to the microphone circuit. The microphone circuit includes an amplifier and a bias resistor. The amplifier is used to receive the signal output by the external microphone, and amplify the signal and output it. The first end of the bias resistor is used to connect to a preset bias voltage. The second end of the bias resistor is used to connect the output end of the microphone, and the second end of the bias resistor is connected to the input end of the amplifier. The input end of the amplifier is used as the input end of the microphone circuit. The output end of the amplifier is used as the output end of the microphone circuit. That is, the method for raising sound pressure overload point of microphone of the present invention can be applied to the microphone circuit 100, the microphone circuit 200, the microphone circuit 300 and the microphone module 400.

Figure 6:
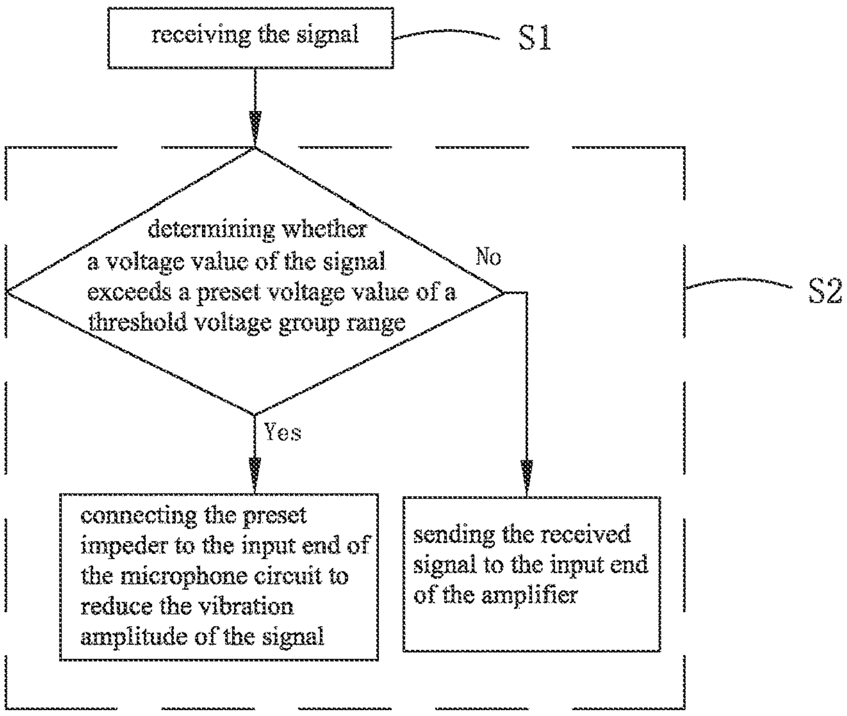
FIG. 6 is a process chart of a method for raising sound pressure overload point of microphone of the present invention.

Please refer to FIG. 6, FIG. 6 is a process frame view of the method for raising sound pressure overload point of microphone of the present invention.

The method for raising sound pressure overload point of microphone of the present invention includes the steps:

Step S1, receiving the signal.

Step S2, determining whether the voltage value of the signal exceeds the preset voltage value range of the threshold voltage group:

If so, connecting the preset impeder to the input end of the microphone circuit to reduce the vibration amplitude of the signal;

If not, sending the received signal to the input end of the amplifier;

Wherein, the impeder corresponds to the threshold voltage group one-to-one.

In the method for raising sound pressure overload point of microphone of the present invention, when the amplitude of the signal exceeds the preset voltage value range, by additionally connecting the preset impeder, the equivalent load resistance of the output end of the microphone becomes smaller, thereby reducing the vibration amplitude of the signal, ensuring the vibration amplitude of the output signal of the amplifier is within the clamping range of the power supply voltage and grounding of the amplifier. Therefore, the sound pressure overload point of microphone is improved, so that the total harmonic distortion performance is good, and the output electrical signal is good.

In this embodiment, n the threshold voltage groups are included. n impeders are included. Each of the threshold voltage groups corresponds to one of the impeders. This setting makes the threshold voltage group divided into n pcs, so that the greater the amplitude of the signal output by the microphone is, the more impeders are continuously added. The vibration amplitude of the signal is compressed by the continuous parallel impeder, and the smaller the equivalent load impeder on the microphone is, the smaller the vibration amplitude of the signal is. Therefore, the output signal can be output normally, thereby improving the sound pressure overload point of microphone, so that the total harmonic distortion performance is good, and the output electrical signal is good.

It should be pointed out that the resistance, capacity, microphone, impedance, constant current source and transistor used in this embodiment are all circuit modules or devices commonly used in the field. The user selects the model and parameter performance according to the designed index, which will not be described in detail here. The microphone circuit provided by the present invention is provided with a bias network module at the position connecting the external output end of the microphone, and judge the voltage value of the signal output by the microphone through the bias network module. If the voltage value of the signal exceeds the preset voltage value of the threshold voltage group range, connect the impeder corresponding to the bias network module to the input end of the microphone circuit to reduce the vibration amplitude of the signal. The circuit configuration makes when the vibration amplitude of the signal exceeds the preset voltage value range, by additionally connecting the preset impeder, the equivalent load resistance of the output end of the microphone is reduced, thereby reducing the vibration amplitude of the signal, ensuring the vibration amplitude of the output signal of the amplifier is within the clamping range of the power supply voltage and grounding of the amplifier. Therefore, the microphone circuit, the microphone module and the method for raising the sound pressure overload point of microphone provided by the present invention improve the sound pressure overload point of microphone, so that the total harmonic distortion performance is good, so that the output electrical signal is good.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A microphone circuit including:

an amplifier for receiving a signal output by an external microphone, and amplifying the signal;

a bias resistor having a first end connecting to a preset bias voltage and a second end connecting to an output end of the microphone and connecting to an input end of the amplifier;

wherein, the amplifier serves as an input end of the microphone circuit; the output end of the amplifier serves as the output end of the microphone circuit;

the microphone circuit further includes a bias network module connected to the input end of the microphone circuit for judging a voltage value of the signal;

when the voltage value of the signal exceeds a preset voltage value of a threshold voltage group range, connect an impeder corresponding to the bias network module to the input end of the microphone circuit to reduce the vibration amplitude of the signal, the threshold voltage group includes an upper threshold voltage and a lower threshold voltage; the voltage value of the threshold voltage group is less than or equal to that of the upper threshold voltage and greater than or equal to the voltage value of the lower threshold voltage; and the impeder corresponds to the threshold voltage group one-to-one.

2. The microphone circuit as described in claim 1, wherein the bias network module includes a first bias network circuit having a first PMOS tube, a first NMOS tube, and a first impeder;

a source electrode of the first PMOS tube connects to the first lower bias voltage, and a drain electrode of the first PMOS tube connects to the drain electrode of the first NMOS tube and a first end of the first impeder;

a grid electrode of the first PMOS tube connects to the input end of the microphone circuit, and the grid electrode of the first PMOS tube is respectively connected to the grid electrode of the first NMOS tube and the second end of the first impeder;

a source electrode of the first NMOS tube connects to the first upper bias voltage; and the upper threshold voltage of the first bias network circuit is a sum of the voltage value of the first upper bias voltage and the voltage value of the n-type transistor turn-on threshold voltage of the first NMOS tube; the lower threshold voltage of the first bias network circuit is a sum of the voltage value of the first lower bias voltage and the voltage value of the p-type transistor turn-on threshold voltage of the first PMOS tube.

3. The microphone circuit as described in claim 2, wherein the bias network module further includes an nth bias network circuit, where n is a positive integer and not less than 2; the nth bias network circuit includes a nPMOS tube, a nNMOS tube and a nth impeder;

the source electrode of the nPMOS tube is used for connecting to the nth lower bias voltage, and the drain electrode of the nPMOS tube is respectively connected to the drain electrode of the nNMOS tube and the first end of the nth impeder;

the grid electrode of the nPMOS tube is used for connecting to the input end of the microphone circuit, and the grid electrode of the nPMOS tube is respectively connected to the grid electrode of the nNMOS tube and the second end of the nth impeder;

the source electrode of the nNMOS tube is used to connect to the nth bias voltage;

the upper threshold voltage of the nth bias network circuit is the sum of the voltage value of the nth upper bias voltage and the voltage value of the n-type transistor turn-on threshold voltage of the nNMOS tube; the lower threshold voltage of the nth bias voltage network circuit is the sum of the voltage value of the nth lower bias and the voltage value of the p-type transistor turn-on threshold voltage of the nPMOS tube; and the first upper bias voltage is smaller than the nth upper bias voltage, and the nth lower bias voltage is smaller than the first lower bias voltage.

4. The microphone circuit as described in claim 1, wherein the amplifier includes a constant current source and a first transistor;

an input end of the constant current source is connected to the power supply voltage;

an output end of the constant current source is connected to the first source electrode of the transistor, and the first source electrode of the transistor serves as the output end of the microphone circuit;

the first grid electrode of the transistor serves as the input end of the microphone circuit, and the first drain electrode of the transistor is connected to ground.

5. A microphone module, including:

a microphone capacitor and a microphone circuit as described in claim 1; wherein the first end of the microphone capacitor is connected to the bias voltage of microphone, and the second end of the microphone capacitor is connected to the input end of the microphone circuit;

the microphone capacitor is equivalently formed when the microphone is connected to the input end of the microphone circuit.

6. A method for raising a sound pressure overload point of a microphone, which is applied to a microphone circuit having:

an amplifier for receiving a signal output by an external microphone, and amplifying the signal;

a bias resistor having a first end connecting to a preset bias voltage and a second end connecting to an output end of the microphone and connecting to an input end of the amplifier;

wherein, the amplifier serves as an input end of the microphone circuit; the output end of the amplifier serves as the output end of the microphone circuit;

the microphone circuit further includes a bias network module connected to the input end of the microphone circuit for judging a voltage value of the signal;

and wherein the method includes the following steps of:

receiving the signal;

determining whether a voltage value of the signal exceeds a preset voltage value of a threshold voltage group range: if yes, connecting the preset impeder to the input end of the microphone circuit to reduce the vibration amplitude of the signal, the threshold voltage group includes an upper threshold voltage and a lower threshold voltage; the voltage value of the threshold voltage group is less than or equal to that of the upper threshold voltage and greater than or equal to the voltage value of the lower threshold voltage; if not, sending the received signal to the input end of the amplifier;

the impeder corresponds to the threshold voltage group one-to-one.

7. The method for raising the sound pressure overload point of the microphone as described in claim 6, wherein, the threshold voltage group includes n pieces of threshold voltage group, and n pieces of impeder; each of the threshold voltage groups corresponds to one of the impeders.

* * * * *